June 15, 1937.  B. H. SHOEMAKER  2,084,270
LUBRICATING OIL
Filed Oct. 24, 1936  2 Sheets-Sheet 1

INVENTOR
Bernard H. Shoemaker
BY
Arthur H. Bransky
ATTORNEY

Patented June 15, 1937

2,084,270

UNITED STATES PATENT OFFICE 2,084,270

LUBRICATING OIL

Bernard H. Shoemaker, Hammond, Ind., assignor to Standard Oil Company, Chicago, Ill., a corporation of Indiana Application October 24, 1936, Serial No. 107,501

7 Claims. (Cl. 87—9)

This invention relates to improvements in lubricating oils and particularly to corrosion inhibited lubricating oils.

In order to obtain increased acceleration at increased speed in present day internal combustion engines it has become necessary to increase both the thermal and mechanical stresses in the engines. In many cases this increase in thermal and mechanical stresses has reached a point where the soft low melting alloys such as Babbitt metal are no longer sufficiently durable for bearing duty under such conditions. To remedy this, "hard metal" alloy bearings such as copper-lead alloy, cadmium-silver alloy, and cadmium-nickel alloy bearings have to a large extent replaced the Babbitt metal bearing. While mechanically these hard metal alloy bearings have been satisfactory, the use of these alloys has created corrosion problems, particularly in connection with "highly refined" lubricating oils, some of which may be very corrosive to bearings of the hard metal type.

By "highly refined" lubricating oils we mean viscous lubricating oils which have a viscosity in the range of S. A. E. No. 10 oils and higher and which have been subjected to such refining processes that the paraffinicity of the oil is markedly increased. It has been found that these "highly refined" lubricating oils cause corrosion to alloy bearing of a cadimium-silver type to the extent of about 5 mg./cm.$^2$ and even greater when such bearings are submerged for about 25 hours or less in an air agitated oil which has been pre-oxidized at about 341° F. for 25 to 50 hours. The motor oil may be a "highly refined" lubricating oil as such or mixtures of "highly refined" lubricating oils with less "highly refined" lubricating oils or, stated in another way, mixtures of corrosive oils and non-corrosive oils, examples of the latter being lubricating oil fractions from Winkler crude or crudes of the Winkler type.

It is therefore an object of my invention to provide a "highly refined" motor oil which will not corrode hard metal bearings of the cadmium-silver and copper-lead type.

Another object of my invention is to provide a corrosion inhibitor which, when added to a "highly refined" lubricating oil will prevent the corrosion of hard metal bearings such as cadmium-silver and copper-lead alloy bearings and which will not be detrimental to the other desirable properties of a motor oil.

A further object of my invention is to provide a motor oil containing a very small amount of certain materials which will inhibit the corrosion of bearings of the hard metal alloy type in internal combustion engines.

Other objects of my invention will become apparent from the following description and the accompanying charts which form a part of this specification, in which Fig. 1 is a graph showing the effectiveness of my preferred corrosion inhibitors on cadmium-silver alloy bearings;

Figure 1:
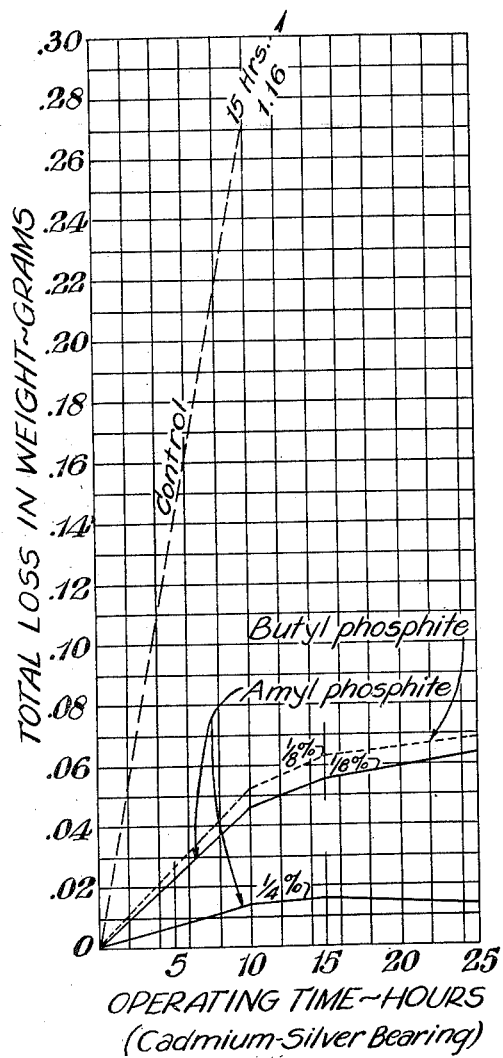

I have found that the foregoing objects may be attained by adding to a motor oil up to about 2%, but preferably 0.05% to 0.75% of the mixtures of butyl phosphites or mixtures of amyl phosphites. These mixtures consist preferably of the di- and tri-alkyl phosphites, although mixtures of the di- and tri-alkyl phosphites containing less than 3% of the mono-alkyl phosphites may also be used. Examples of these mixtures are tri-amyl phosphite with from 5 to 50% of di-amyl phosphite. Similar mixtures of tri-butyl phosphite and di-butyl phosphite may be used. Also, either of these same mixtures with not more than 3% of the mono-amyl or mono-butyl phosphite may be used.

These mixtures of butyl phosphites or mixtures of amyl phosphites may be prepared by the following reaction and procedure: A mixture of isoamyl alcohol or n-butyl alcohol and an organic amine, preferably a tertiary amine, such as dimethylaniline or pyridine, in a diluent, preferably a liquefied normally gaseous hydrocarbon, such as butane, is treated with phosphorous trichloride at a temperature of about 50° F. or lower. During the reaction period at this temperature the mixture is vigorously agitated. The temperature of the reaction mass may be controlled by flashing off a portion of the butane. After the reaction is completed the mixture is filtered, and the filtrate, comprising the alkyl phosphite is freed of the diluent by suitable means. The diluent freed filtrate may then be vacuum distilled to remove any unreacted alcohol and/or amine. I prefer to use liquefied normally gaseous hydrocarbons since the same may be used as the diluent, and as a refrigerant by reducing the pressure and flashing off a portion of the liquefied gas. The resulting product is a mixture of substantially pure compounds comprising the tri-alkyl phosphite with varying proportions of the di-alkyl phosphite. Under certain conditions, for example, when moisture or HCl is present, small amounts of the mono-alkyl phosphite will be formed.

Mixtures of the phosphites comprising di- and tri-butyl phosphites and mixtures comprising di- and tri-amyl phosphites were tested in a Mid-Continent distillate solvent extracted S. A. E. 20 motor oil in accelerated engine tests conducted under conditions definitely more severe than are encountered in service. The tests were made in a six-cylinder engine having cadmium-silver and copper-lead alloy bearings, and operated at 2500 R. P. M. with a load of 30 B. H. P. (which is equivalent to 50 M. P. H. with a load of about 33⅓% in excess of the normal road load). The oil sump was maintained at a temperature of about 300° F. and the jacket temperature at about 180 to 190° F. The effectiveness of these mixtures of butyl or amyl phosphites as corrosion inhibitors in the presence of cadmium-silver bearings is well illustrated by Table I.

TABLE I
*Cadmium-silver bearings*

| Oil | Engine operating time (hrs.) | Total loss of bearing metal in wt. (gm.) per bearing |
|---|---|---|
| Control | 15 | 1.16 |
| Control+0.125% mixed isoamyl phosphites | 25 | 0.062 |
| Control+0.25% mixed isoamyl phosphites | 25 | 0.016 |
| Control+0.125% mixed n-butyl phosphites | 25 | 0.068 |

Table I shows the relative effectiveness of the mixture of iso-amyl and the mixture of n-butyl phosphites in reducing the corrosiveness of a "highly refined" motor oil on cadmium-silver bearings. It will be noted that a "highly refined" motor oil without a corrosion inhibitor resulted in a loss of 1.16 grams of bearing metal in 15 hours of service while using 0.125% of mixed iso-amyl phosphites in the oil a loss of only 0.062 gram of bearing metal was obtained during 25 hours of service, and the addition of 0.25% of mixed iso-amyl phosphites reduced this loss to 0.016 gram of bearing metal during 25 hours of service. The use of 0.125% of mixed butyl phosphites in the same "highly refined" motor oil under identical operating conditions resulted in a loss of 0.068 gram in 25 hours of service.

The effectiveness of mixed iso-amyl and mixed n-butyl phosphites in inhibiting the corrosion of copper-lead alloy bearings is demonstrated by the results tabulated in Table II. The data were obtained from tests made as above described.

TABLE II
*Copper-lead bearings*

| Oil | Engine operating time (hrs.) | Total loss of bearing metal in wt. (gm.) per bearing |
|---|---|---|
| Control | 15 | 0.28 |
| Control+0.25% mixed isoamyl phosphite | 25 | 0.02 |
| Control+0.125% mixed n-butyl phosphite | 25 | 0.16 |
| Control+0.025% mixed n-butyl phosphite | 25 | 0.058 |

It will be noted that using a highly refined motor oil without an inhibitor resulted in a loss of 0.28 gram of bearing metal per bearing in 15 hours while the addition of 0.25% of mixed iso-amyl phosphites to the oil resulted in a loss of 0.02 gram of bearing metal per bearing in 25 hours. The addition of 0.125% and 0.25% n-butyl phosphites to the oil resulted in a loss of 0.16 gram and 0.058 gram of bearing metal per bearing respectively in 25 hours.

Figure 2:
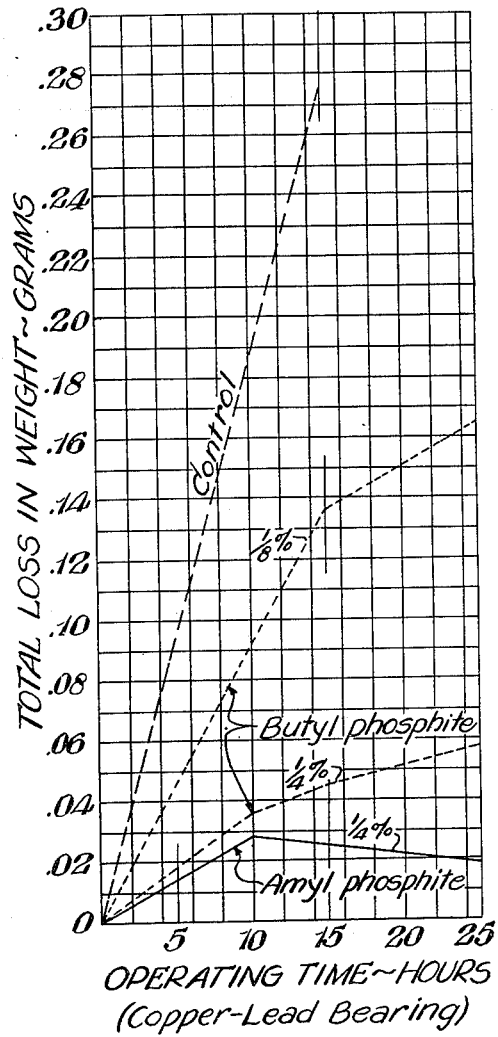
Fig. 2 is a graph showing the effectiveness of my preferred corrosion inhibitors on copper-lead alloy bearings.

The data tabulated above are graphically illustrated in Figures 1 and 2. These curves show the marked decrease in corrosion of cadmium-silver alloy bearings and copper-lead alloy bearings with relatively small amounts of mixed iso-amyl phosphites and mixed n-butyl phosphites dissolved in the oil. The apparent increasing bearing loss during the first 10 to 15 hours of service is, I believe, due to a conditioning of the bearings during the "breaking-in" period.

Figure 3:
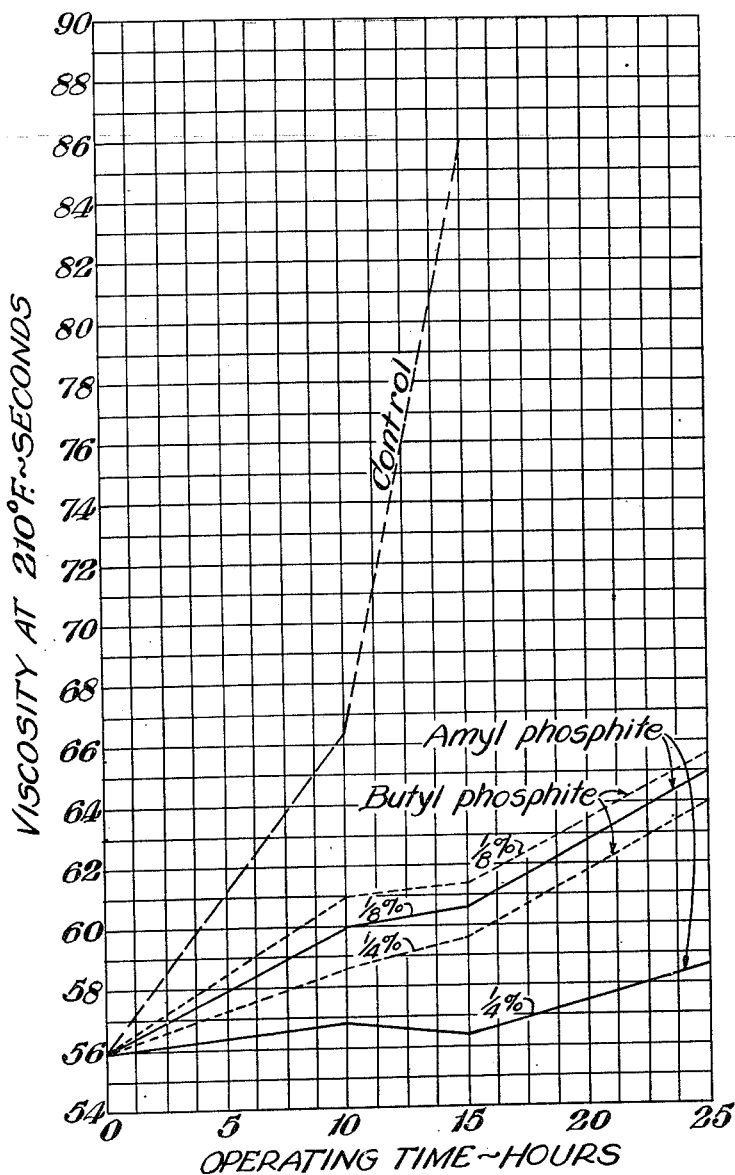
Fig. 3 is a graph showing the stabilizing effect of my preferred corrosion inhibitors.

The stability of the oil in terms of viscosity increase under conditions of severe engine operation in the presence of hard metal bearings is markedly improved by the addition of mixed butyl and mixed amyl phosphites is graphically illustrated in Figure 3 in which the relative effectiveness of the mixed iso-amyl phosphites and mixed n-butyl phosphites in reducing the viscosity increase of the oil is illustrated. In referring to Figure 3 the viscosity of the control oil increased from 56 to 86 seconds at 210° F. during 15 hours of service while the oil containing 0.125% of mixed iso-amyl phosphites increased from 56 seconds at 210° F. to only 65 seconds at 210° F. during 25 hours of service and the viscosity of the oil containing 0.25% of mixed iso-amyl phosphites increased from 56 seconds at 210° F. to 58.6 seconds at 210° F. during 25 hours of service. Using 0.125% of mixed n-butyl phosphites the viscosity at 210° F. after 25 hours of service was only 66 seconds and with 0.25% of mixed n-butyl phosphites the viscosity at 210° F. after 25 hours of service was only 64 seconds. The foregoing results clearly show the effectiveness of the mixed amyl and mixed butyl phosphites in stabilizing the oil during operating conditions.

The terms "mixed n-butyl phosphites" and "mixed iso-amyl phosphites" used herein mean a mixture of di- and tri-n-butyl phosphites or a mixture of di- and tri-n-butyl phosphites with less than 3% of mono-n-butyl phosphite present in the mixture, and a mixture of di- and tri-iso-amyl phosphites or a mixture of di- and tri-iso-amyl phosphite with less than 3% of mono-iso-amyl phosphite present in the mixture. While I have used the mixed n-butyl phosphites and the mixed iso-amyl phosphites to illustrate my invention, my invention contemplates the use of the mixed iso-butyl phosphites and the mixed n-amyl phosphites.

While I have described my invention with specific embodiments thereof, the same are to be considered merely as illustrative and not as limitations thereof, except as defined by the appended claims which should be given the broadest interpretation permitted by the prior art.

I claim:

1. A corrosion inhibited motor oil comprising a mineral lubricating oil having dissolved therein a small amount of an alkyl phosphite containing 4 to 5 carbon atoms in each alkyl radical said alkyl radicals being directly attached to the oxygens of the phosphite radical, said alkyl phosphite comprising substantially di- and tri-alkyl phosphites and a small amount but less than 3% of the corresponding mono alkyl phosphite in the phosphite mixture.

2. A corrosion inhibited motor oil comprising a mineral lubricating oil and a small amount of a mixture of mono-, di- and tri-isoamyl phosphite dissolved therein said isoamyl radicals being directly attached to the oxygens of the phosphite radical, said mono-isoamyl phosphite being present in an amount less than 3% of the isoamyl phosphite mixture.

3. A corrosion inhibited motor oil comprising a mineral lubricating oil and a small amount of a mixture of mono-, di- and tri-n-butyl phosphite dissolved therein said n-butyl radicals being directly attached to the oxygens of the phosphite radical, said mono n-butyl phosphite being present in an amount less than 3% of the n-butyl phosphite mixture.

4. The method of preventing the corrosion of bearing metal alloys selected from the group consisting of cadmium-silver alloy, cadmium-nickel alloy and copper-lead alloy in the presence of a highly refined lubricating oil which comprises dissolving in said lubricating oil a small amount of an alkyl phosphite containing 4 to 5 carbon atoms in each alkyl radical said alkyl radicals being directly attached to the oxygens of the phosphite radical, said alkyl phosphite comprising substantially di- and tri-alkyl phosphites and a small amount but less than 3% of the corresponding mono-alkyl phosphite.

5. A corrosion inhibited motor oil comprising a mineral lubricating oil and 0.05% to 0.75% of an alkyl phosphite containing 4 to 5 carbon atoms in each alkyl radical said alkyl radicals being directly attached to the oxygens of the phosphite radical, said alkyl phosphite comprising substantially di- and tri-alkyl phosphites and a small amount but less than 3% of the corresponding mono-alkyl phosphite dissolved therein.

6. A corrosion inhibited motor oil comprising a mineral lubricating oil and 0.05% to 0.75% of a mixture of mono-, di- and tri-isoamyl phosphite dissolved therein said isoamyl radicals being directly attached to the oxygens of the phosphite radical, said mono-isoamyl phosphite being present in an amount less than 3% of the isoamyl phosphite mixture.

7. A corrosion inhibited motor oil comprising a mineral lubricating oil and 0.05% to 0.75% of a mixture of mono-, di- and tri-n-butyl phosphite dissolved therein said n-butyl radicals being directly attached to the oxygens of the phosphite radical, said mono n-butyl phosphite being present in an amount less than 3% of the n-butyl phosphite mixture.

BERNARD H. SHOEMAKER.

CERTIFICATE OF CORRECTION.

Patent No. 2,084,270.

June 15, 1937.

BERNARD H. SHOEMAKER.

It is hereby certified that error appears in the printed specification of the above numbered patent requiring correction as follows: Page 2, first column, line 69, Table II, for "0.0 25%" read 0.25%; and that the said Letters Patent should be read with this correction therein that the same may conform to the record of the case in the Patent Office.

Signed and sealed this 24th day of August, A. D. 1937.

Leslie Frazer

Acting Commissioner of Patents.

(Seal)